June 2, 1931.     C. H. MILLER     1,807,633
CHICK FEEDER.
Filed April 19, 1930
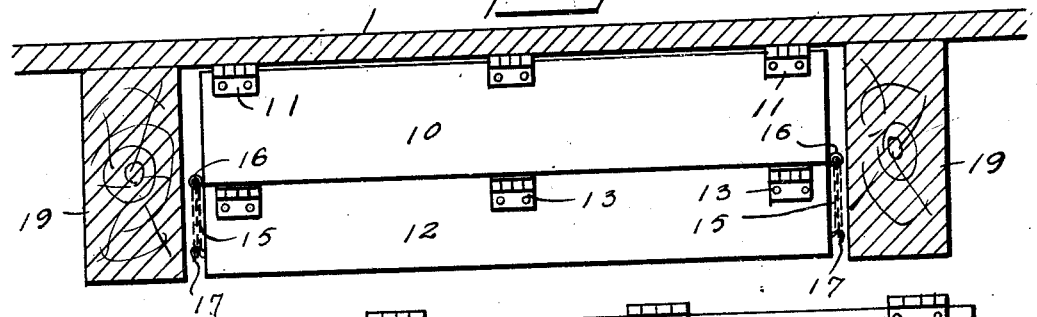
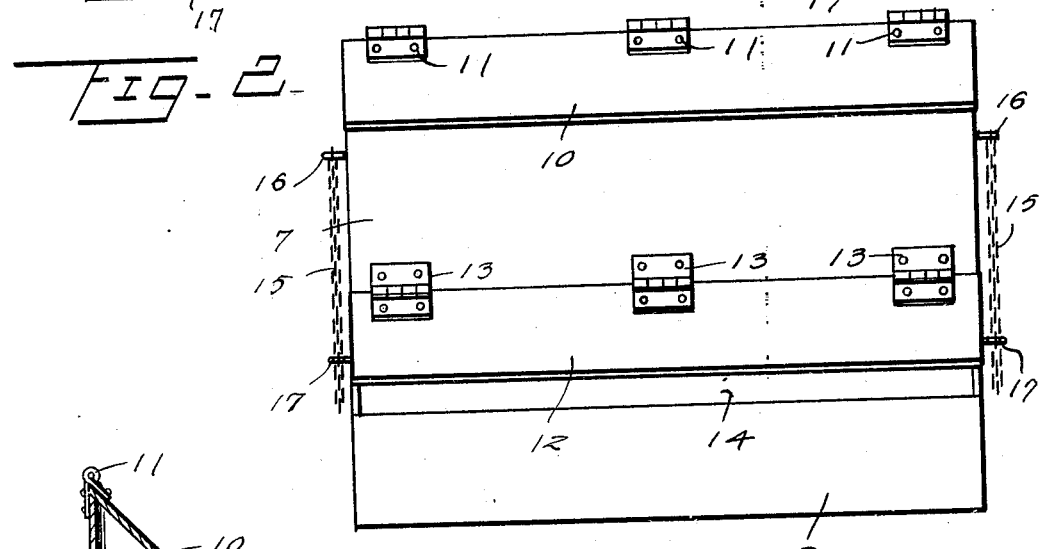
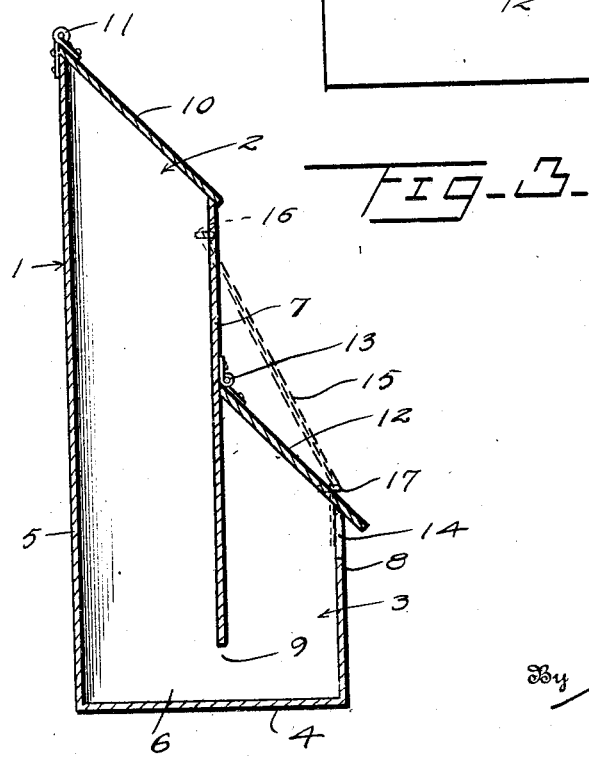
Inventor
C.H.Miller
By Watson E. Coleman
Attorney Patented June 2, 1931

1,807,633

UNITED STATES PATENT OFFICE

CHARLES H. MILLER, OF DE WITT, NEBRASKA

CHICK FEEDER

Application filed April 19, 1930. Serial No. 445,685.

This invention relates to chick feeders of that type embodying a hopper, a trough carried by the hopper and communicating therewith, and inclined lids for the hopper and trough.

The invention has for one of its objects to improve and simplify the general construction of chick feeders of this character and to provide one which shall be adapted to be secured to and against the wall of a poultry house with the lid of its hopper inclining downwardly and outwardly from the wall so as to prevent chickens from roosting thereon.

The invention also aims to provide a chick feeder of the character stated wherein the trough thereof shall be provided in its front side with an opening through which access is to be had to the feed in the trough, wherein the lid of the trough shall incline downwardly and outwardly from the front wall of the hopper so as to prevent chickens from roosting thereon, and wherein the lid shall extend downwardly and outwardly beyond the front wall of the trough so as to close the upper side of the feed opening in said wall and provide a guard adapted to prevent chicks and droppings from entering the trough by way of said opening.

The invention further aims to provide a chick feeder of the character stated which shall embody means through the medium of which the lid of its through may be supported in various partly raised positions so as to increase the effective size of the feeding opening as the chickens increase in size.

The invention is hereinafter fully described and claimed, and illustrated in the accompanying drawings, wherein:—

Figure 1 is a view partly in top plan and partly in horizontal section illustrating the manner in which the chick feeder is adapted to be secured to the wall of a poultry house;

Figure 2 is a view in front elevation of the chick feeder, and

Figure 3 is a sectional view taken on a plane extending vertically and centrally through the chick feeder.

The chick feeder 1 may be made of sheet metal or other suitable material or materials, and comprises a hopper 2 and a trough 3. The trough 3 is arranged at the lower side of the hopper 2, and the hopper extends upwardly above the trough. The hopper 2 embodies a bottom wall 4, a straight and vertically arranged rear wall 5, side walls 6, and a front wall 7. The bottom wall 4, and the lower portions of the side walls 6 extend forwardly, and a vertical wall 8 is secured to the front edges of such extended portions, to provide the trough 3. The front wall 7 extends below the upper edges of the side walls 6 to provide a rear wall for the trough 3, and such wall terminates short of the bottom wall 4 to provide a restricted passage 9 between the hopper 2 and the trough.

The trough 2 is provided with a downwardly and forwardly inclined lid 10 which is hinged at its upper or rear edge to the upper edge of the rear wall 5, as shown at 11. The trough 3 is provided with a downwardly and forwardly inclined lid 12, which is hinged at its upper or rear edge to the front wall 7, as shown at 13.

The front wall 8 of the trough 3 terminates short of the upper edges of the side walls of the trough so as to provide an opening 14 which extends throughout the entire length of the trough and through which the chicks have access to the feed in the trough. The lid 12 extends across and closes the upper side of the feeding opening 14, and extends downwardly and forwardly beyond the opening so as to provide a guard adapted to prevent chicks and droppings from entering the trough by way of the opening. When the lid 12 is in fully closed position, the feeding opening 14 is restricted as to size so as to adapt the feeder for use by small chicks. The effective size of the feeding opening 14 may be increased by supporting the lid 12 in various partly raised positions so as to adapt the feeder for use by the chicks as they grow larger. The lid 12 is adapted to be supported in various partly raised positions by chains 15 which are secured to the side walls 6 and above the lid, as shown at 16, and which are secured to the end edges of the lids, as shown at 17. The means 17 are in the form of hooks with which various links of the chains 15 may be engaged to effect the supporting of the lid 12 in various raised positions.

As its rear wall 5 is straight and vertically arranged, the feeder 1 is adapted to be secured to and against the wall of a poultry house between adjacent studs of the house, as shown in Figure 1, wherein 18 designates the wall and 19 the studs. The lid 10 extends downwardly and forwardly from the wall 18 of the poultry house, and the lid 12 extends downwardly and forwardly from the front wall of the hopper 2.

In view thereof, and as the feeder is arranged between the studs 19 of the poultry house, chickens cannot roost upon and soil the lids of the feeder. Droppings and other foreign matter are prevented from entering the trough 3 by way of the feeding opening 4 by the guard extension of the lid 12. The feed is placed in the hopper 2 and flows into the trough 3 by way of the opening 9. The feeder is simple, sanitary and highly efficient, and is capable of being manufactured and sold at a comparatively low cost.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A feeder of the character set forth, comprising a hopper, a lid for the hopper arranged thereon in a downwardly and forwardly inclined position, a trough arranged at the front side of the hopper and communicating therewith and provided in its front wall with a feeding opening extending longitudinally of said wall and opening out through the upper edge thereof, and a lid for the trough arranged thereon in a downwardly and forwardly inclined position and extending beyond said wall to provide a guard for said feeding opening.

2. A feeder of the character set forth, comprising a hopper, a lid for the hopper arranged thereon in a downwardly and forwardly inclined position, a trough arranged at the front side of the hopper and communicating therewith and provided in its front wall with a feeding opening extending longitudinally of said wall and opening out through the upper edge thereof, a lid for the trough arranged thereon in a downwardly and forwardly inclined position and extending beyond said wall to provide a guard for said feeding opening, the trough lid restricting the vertical dimension of said feeding opening when in fully closed position, and means by which the trough lid may be supported in various partly opened positions to increase the effective vertical dimension of said feeding opening.

In testimony whereof I hereunto affix my signature.

CHARLES H. MILLER.